June 24, 1952      J. E. JOHNSON      2,601,296
AUTOMATIC ALIGNING AND LEVELING TWO-WAY PLOW
Filed Feb. 8, 1950      3 Sheets-Sheet 1
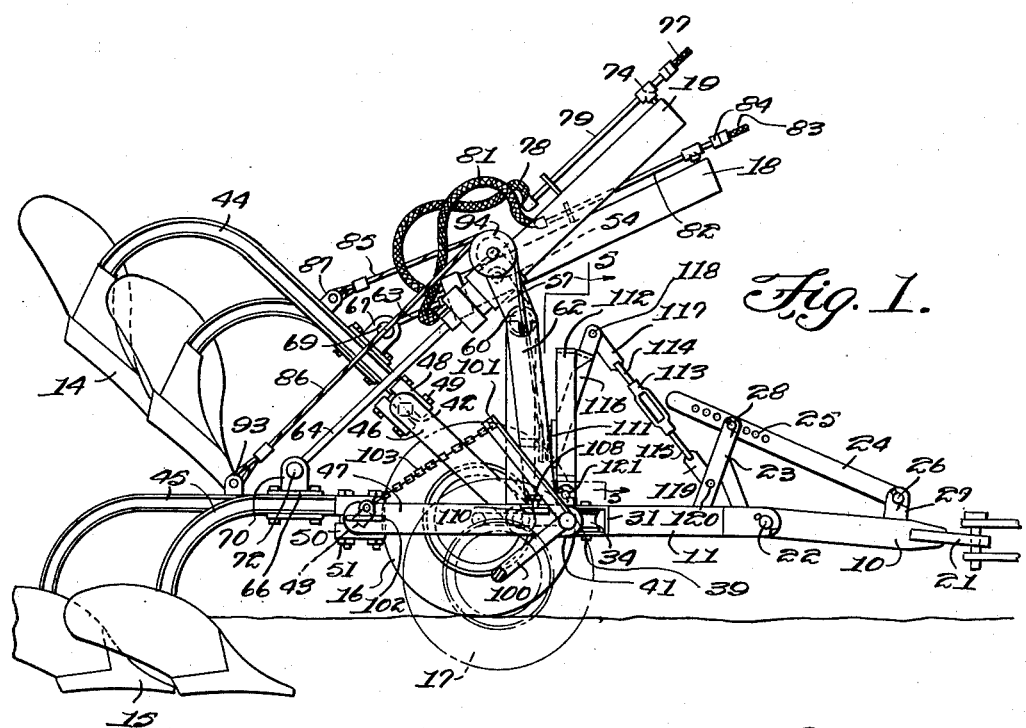
INVENTOR.
James E. Johnson,
BY Victor J. Evans & Co.
ATTORNEYS June 24, 1952 J. E. JOHNSON 2,601,296
AUTOMATIC ALIGNING AND LEVELING TWO-WAY PLOW
Filed Feb. 8, 1950 3 Sheets-Sheet 2
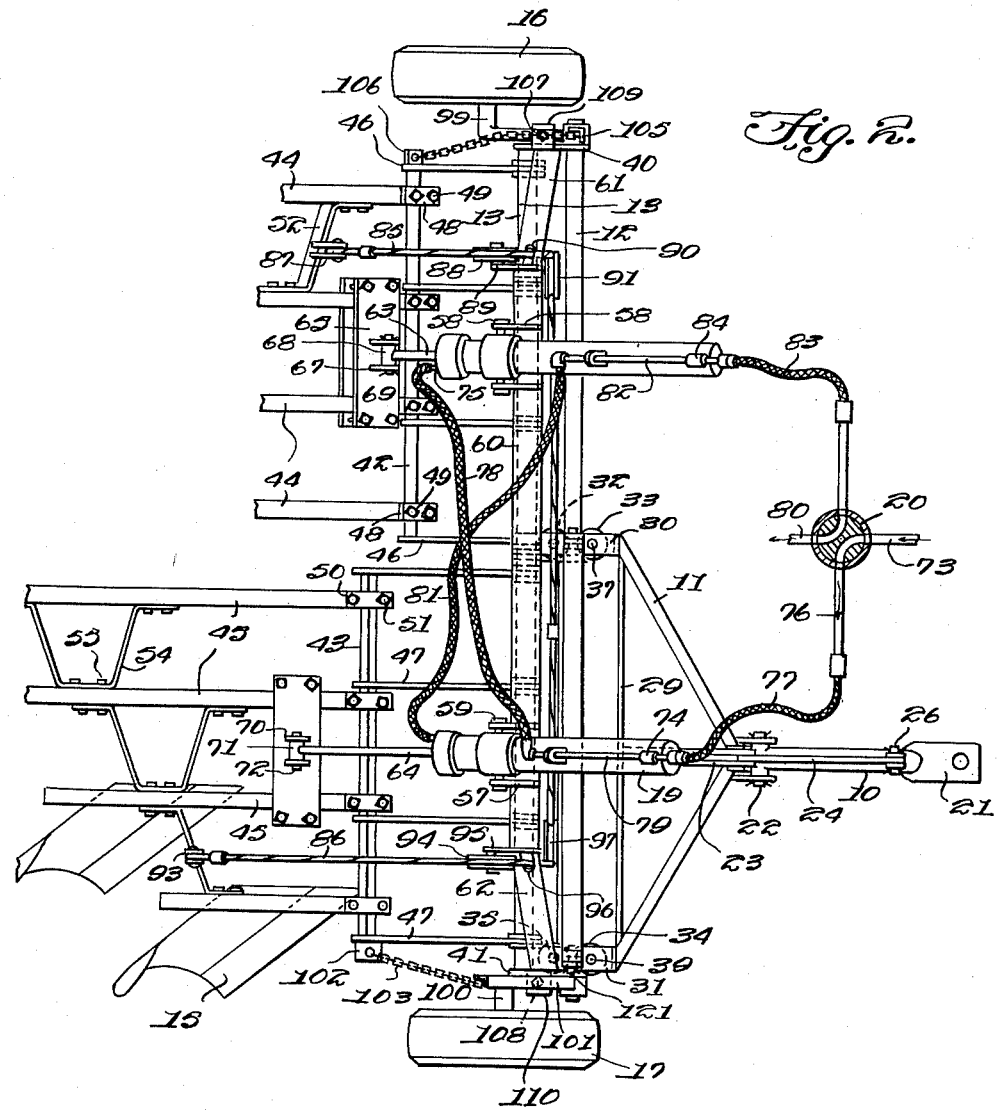
INVENTOR.
James E. Johnson,
BY Victor J. Evans & Co.
ATTORNEYS

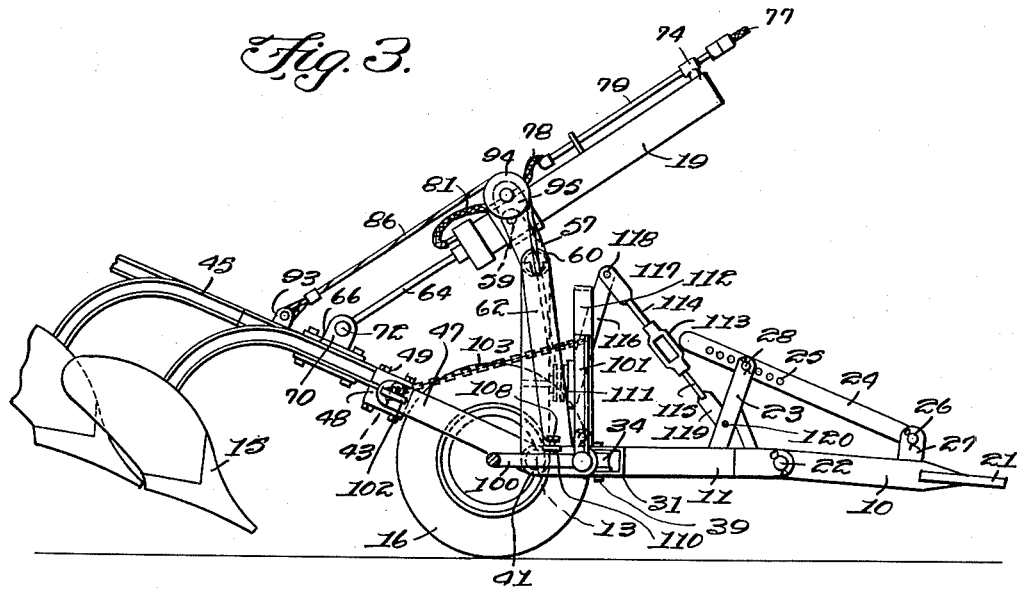
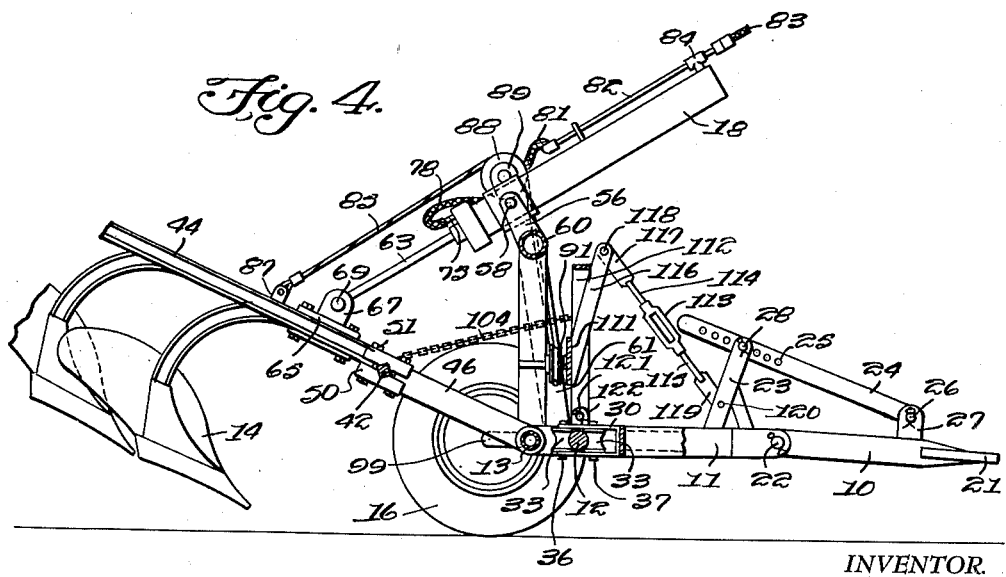

Patented June 24, 1952

2,601,296

UNITED STATES PATENT OFFICE 2,601,296

AUTOMATIC ALIGNING AND LEVELING TWO-WAY PLOW

James E. Johnson, South Dos Palos, Calif.

Application February 8, 1950, Serial No. 142,979

4 Claims. (Cl. 97—29)

This invention relates to farm implements and particularly gang plows of the type drawn by tractors, and in particular a twin plow structure having two duplicate plowing units with the units positioned on opposite sides of the center of the plow and with the plows of the units oppositely positioned wherein with the plow traveling in one direction the plows of one unit are used and with the plow traveling in the opposite direction the plows of the unit on the opposite side of the center are used, and in which a tongue by which the implement is drawn is automatically centered on the plows being used, and a supporting wheel on the side of the implement in which the plows being used are positioned is automatically dropped into a furrow for leveling the plow.

The purpose of this invention is to provide a plow for plowing back and forth across a field without traveling around the outer edge of the field or a section thereof.

In the usual method of plowing a furrow is started around the field or section thereof and with each trip around the field another furrow is plowed, or where gang plows are used another group of furrows are plowed. With this method of plowing it is substantially impossible to come out even at the center and it is also necessary to drag the plow over plowed ground to remove the plow and tractor from the field. With this thought in mind this invention contemplates a plow having plows positioned to plow in one direction on one side of the center and in the other direction on the opposite side of the center and means automatically actuating the plows to operative and inoperative positions as the ends of the field are reached and also means for automatically shifting the tongue to the group of plows being used, and means for leveling the plows.

The object of this invention is, therefore, to provide means for constructing a twin plow having duplicate sets of oppositely positioned plows spaced equal distances from a center whereby the plows are readily actuated to operative and inoperative positions with the pulling tongue shifted from side to side with the movement of the plow and with the supporting wheels also raised and lowered as the plows are actuated.

Another object of the invention is to provide a twin plow of the gang type in which the plows and pulling tongues are actuated for operations on either side of the center in which means is provided for adjusting the depth of a furrow or furrows formed by the plow.

A further object of the invention is to provide a twin plow having plows for plowing with the plow traveling in two directions and with means for adjusting the pulling force and elevation of the plows which is of a comparatively simple and economical construction.

Other features and advantages of the invention will appear from the following description taken in connection with the drawings wherein:

Figure 1 is a side elevational view of the plow with the supporting wheel on the near side omitted and with one set of plows in the operative position and the other set in the inoperative position.

Figure 2 is a plan view of the plow with the parts in the positions as illustrated in Figure 1, with parts broken away and with parts shown in section.

Figure 3 is a side elevational view of the implement, similar to that shown in Figure 1 with the plow in the inoperative position.

Figure 4 is a similar view showing a longitudinal section through the machine and also showing the plows in the inoperative positions.

Figure 5 is a detail taken on line 5—5 of Figure 1 illustrating the tongue mounting carriage that travels transversely across the frame of the machine and with other parts removed.

Figure 6 is a detail taken on line 6—6 of Figure 5 illustrating the rollers by which the carriage is mounted on a transversely disposed beam.

Referring now to the drawings wherein like reference characters denote corresponding parts the twin two-way gang plow of this invention includes a tongue 10 slidably mounted through a carriage 11 on an axle 12, a pivot bar 13 on which plowshares 14 and 15 are pivotally mounted through supporting frames, supporting wheels 16 and 17, and hydraulic rams 18 and 19 which are controlled by a four-way valve 20.

The tongue 10, which is provided with a clevis 21 on the outer end is pivotally mounted in the forward end of the carriage 11 by a pin 22 and the elevation of the outer end of the tongue is supported from a bracket 23 by a bar 24 which has spaced bolt holes 25 therein. The bar 24 is pivotally mounted by a pin 26 between ears 27 on the forward end of the tongue and the opposite end of the bar is adjustably held by a bolt 28 in the upper end of the bracket 23 with the bolt positioned to extend through the bolt holes 25 of the bar.

The carriage 11 is formed with diagonally disposed braces connected by a bar 29 and U-shaped frames 30 and 31 are provided at the end by which the carriage is slidably mounted on the axle 12 through rollers 32 and 33 in the frames 30 and 34 and 35 in the frame 31. With the carriage mounted in this manner it is free to travel transversely of the plow on the axle 12. The rollers in the U-shaped frames 30 and 31 are formed with concave surfaces to correspond with the outer surfaces of the axle 12 and these rollers are journaled on pins 36 and 37 in the frames 30 and 38 and 39 in the frame 31.

The pivot bar 13 is supported from the ends of the axle 12 by plates 40 and 41 and support bars 42 and 43, which carry the plowshares through beams 44, on the bars 42 and 45 on the bar 43, are supported from the pivot bar 13 with the bar 42 carried in the outer ends of arms 46 and the bar 43 in the outer ends of arms 47. The plow beams 44 of the plowshares 14 are secured on the bar 42 by clamps 48 with bolts 49 therein and the plow beams 45 are secured to the bar 43 by clamps 50 with bolts 51 therein. The plow beams 44 are retained in spaced relation by U-shaped brackets 52 with bolts 53 therein and the beams 45, by U-shaped brackets 54 having bolts 55 therein. With the bars 42 and 43 square, as illustrated in Figures 3 and 4, and with the bar secured in the arms 46 and 47, respectively by welding the plows will be retained by stiff arms in outwardly extended positions from the pivot bar 13, as illustrated in Figures 3 and 4.

The hydraulic cylinders or rams 18 and 19 are pivotally supported in brackets 56 and 57 by pins 58 and 59, respectively and the brackets are positioned on the upper end of a frame 60 that extends upwardly from the pivot bar 13 and that is supported in the upright position by braces 61 and 62 which extend upwardly from the plates 40 and 41 connecting the ends of the pivot bar with the axle 12. The piston rods 63 and 64 of the cylinders 18 and 19, respectively are pivotally mounted on the intermediate plow beams 44 and 45 through brackets 65 and 66, respectively. The bracket 65 being provided with upwardly extended ears 67 between which a hub 68 on the end of the rod 63 is pivotally mounted by a pin 69. Similar ears 70 are provided on the bracket 66 and a hub 71 on the end of the rod 64 is pivotally mounted between these ears by a pin 72.

The hydraulic cylinders are actuated by fluid under pressure from a supply pipe 73 and with the valve 20 positioned as shown in Figure 2 the fluid enters the upper end of the cylinder 19 through a connection 74 and the lower end of the cylinder 18 through a connection 75, the connection 74 being connected to an outlet connection 76 of the valve 20 by a hose 77 and the connection 75 being connected to the connection 74 by a hose 78 and a tube 79 which is positioned on the upper surface of the cylinder 19. With the valve in this position the lower end of the cylinder 19 is connected to a discharge tube 80 through a hose 81, a tube 82 and a hose 83 and a connection 84 on the upper end of the cylinder 18, is also connected to the discharge by the hose 83. With the parts arranged in this manner plows carried by the beams 44 are elevated, the pressure being applied to the lower end of the cylinder 18, and with the pressure relieved at the lower end of the cylinder 19 the plows carried by the beams 45 are lowered.

By a simple movement of an operating lever of the valve 20 the valve may be turned to the opposite direction wherein the pressure is applied to the lower end of the cylinder 19 and the upper end of the cylinder 18 and the pressure of the cylinder 18 is relieved at the lower end with the pressure of the cylinder 19 relieved at the upper end.

The beams 44 of the plow 14 are connected to the carriage 11 by a cable 85 and the beams 45 of the plows 15 are connected to the carriage 11 by a cable 86. The cables 85 and 86 are connected to the carriage in such a manner that as the plows to which they are connected are lowered to the operative positions the carriage is drawn along the axle 12 until the tongue 10 is aligned with the plows in the operative position.

The cable 85 is connected to the beam 44 by a clevis 87 and this cable extends over a pulley 88 on an arm 89 extended from the frame 60, through an opening 90 in the brace 61 over a pulley 91 also journaled on the frame 60, and across the frame to the carriage 11 with the end of the cable being attached to the carriage by a clevis 92. The cable 86 is connected to the beam 45 by a clevis 93 and from the clevis the cable extends over a pulley 94 on an arm 95 on the opposite end of the frame 60, and from the pulley through an opening 96 in the brace 61 and over a pulley 97 to the carriage 11 to which it is connected by a clevis 98. With the parts arranged in this manner it will be noted that as the plows of the beams 44 are lowered the cable 85 draws the carriage 11 over to a position aligned with or centered on the plows 14 whereby a pulling force on the tongue 10 will be centered on the plows in the lowered or operative positions.

The supporting wheels 16 and 17 are journaled on the outer ends of arms 99 and 100, respectively and the arms are mounted on the ends of the axle 12.

The arm 100 on which the wheel 17 on the near side of the plow is mounted is provided with an upwardly extended strut 101, the upper end of which is connected to a collar 102 on the bar 43 by a chain 103 and, as illustrated in Figure 1, the chain pulls the strut 101 over as the plows 15 are lowered to the operative position and the strut which, with the arm 100 forms a bell crank forces the wheel 17 downwardly whereby the wheel drops into a furrow formed by the last plowing action of the plow.

In the same manner the arm 99 is controlled by a chain 104 that is connected to a strut 105 at one end and to a collar 106 at the other whereby as the plows 14 are lowered to the operative position the wheel 16 is pulled downwardly into a furrow.

With the plows in the upper or inoperative positions the wheels 16 and 17 ride on the surface of the ground as shown in Figures 3 and 4 and also as shown in full lines in Figure 1, and the upward movement of the arms 99 and 100 is controlled by adjusting screws 107 and 108 in plates 109 and 110, respectively. With these adjusting screws the elevation of the frame in relation to the ground is adjustable and when plowing is started the screw on one side of the plow is adjusted whereby the plows in the operative positions are lowered to form furrows of the desired depth. After plowing the first row of furrows across the field, the wheel on the opposite side of the machine drops into the last furrow as the machine travels back across the field.

A plate 111 is positioned on a frame 112 on the carriage 11 and the position of the plate 111 is adjusted by a turnbuckle 113 having screws 114 and 115 in the ends with the screw 114 connected to the upper end of the frame 112 through a brace 116 to which a clevis 117 is connected by a pin 118. The screw 115 is pivotally connected to the bracket 23 by a clevis 119 with a pin 120. The frame 112 is pivotally mounted on the carriage 11 by a pin 121 in bearings 122.

With the parts arranged in this manner the field may be plowed by starting at one end and plowing across and back with the machine turned around at each side of the field with one set of plows plowing with the machine traveling in one direction and the other with the machine traveling in the opposite direction and as each set of plows is lowered to the operative position the tongue is automatically shifted to a position aligned with the operating plows and at the same time the wheel on that side of the plow is lowered into the last furrow.

It will be understood that modifications may be made in the design and arrangement of the parts without departing from the spirit of the invention.

What is claimed is:

1. A twin two-way plow comprising a frame having a transversely disposed axle and a pivot bar spaced from the axle, supporting wheels journaled on the frame, a tongue slidably mounted on the axle, a plow pivotally mounted on the pivot bar and positioned on one side of the center of the frame, another plow positioned opposite to the former plow also mounted on said pivot bar and positioned on the opposite side of the center of the frame, means elevating the plows independently to inoperative positions, means actuating the tongue to a position aligned with one of the plows by the plow mounting means as the plow is lowered to an operative position, and means lowering the adjacent supporting wheel of the frame by the said plow as the plow is lowered to the operative position.

2. In a twin two-way gang plow, the combination which comprises a frame having a transversely disposed axle mounted therein, a pivot bar spaced from and parallel to the axle also mounted in the frame, supporting wheels journaled on the frame for supporting the frame in spaced relation to a surface upon which the plow is positioned, a tongue carried by the axle and longitudinally slidable thereon, a plurality of plows pivotally mounted on the pivot bar positioned on one side of the center of the plow and mounted to plow away from the center thereof, a plurality of plows pivotally mounted on the said pivot bar positioned on the side of the center opposite to that of the former plows and also mounted to plow away from the center of the plow, the plows on one side of the center being opposite to the plows on the opposite side thereof, hydraulic cylinders pivotally mounted on the frame and positioned to elevate the plows, means connecting the plows on each side of the center to the tongue independently whereby the plows actuate the tongue to operative positions as the plows are lowered, and means actuating the said hydraulic cylinders from a remote point.

3. In a twin two-way gang plow, the combination which comprises a frame having a transversely disposed axle mounted therein, a pivot bar spaced from and parallel to the axle also mounted in the frame, supporting wheels journaled on the frame for supporting the frame in spaced relation to a surface upon which the plow is positioned, a tongue carried by the axle and longitudinally slidable thereon, a plurality of plows pivotally mounted on the pivot bar positioned on one side of the center of the plow and mounted to plow away from the center thereof, a plurality of plows pivotally mounted on the said pivot bar positioned on the side of the center opposite to that of the former plows and also mounted to plow away from the center of the plow, the plows on one side of the center being opposite to the plows on the opposite side thereof, hydraulic cylinders pivotally mounted on the frame and positioned to elevate the plows, means connecting the plows on each side of the center to the tongue independently whereby the plows actuate the tongue to operative positions as the plows are lowered, means actuating the supporting wheels by the plows on each side of the center independently whereby the wheel on the side of the machine on which the plows are being lowered is lowered by the plow mounting means.

4. In a twin two-way gang plow, the combination which comprises a frame having a transversely disposed axle mounted therein, a pivot bar spaced from and parallel to the axle also mounted in the frame, supporting wheels journaled on the frame for supporting the frame in spaced relation to a surface upon which the plow is positioned, a tongue carried by the axle and longitudinally slidable thereon, a plurality of plows pivotally mounted on the pivot bar positioned on one side of the center of the plow and mounted to plow away from the center thereof, a plurality of plows pivotally mounted on the said pivot bar positioned on the side of the center opposite to that of the former plows and also mounted to plow away from the center of the plow, the plows on one side of the center being opposite to the plows on the opposite side thereof, hydraulic cylinders pivotally mounted on the frame and positioned to elevate the plows, means connecting the plows on each side of the center to the tongue independently whereby the plows actuate the tongue to operative positions as the plows are lowered, means adjusting the position of the tongue, and means actuating the supporting wheels by the plows on each side of the center independently whereby the wheel on the side of the machine on which the plows are being lowered is lowered by the plow mounting means.

JAMES E. JOHNSON.

REFERENCES CITED

The following references are of record in the file of this patent:

UNITED STATES PATENTS

| Number | Name | Date |
| --- | --- | --- |
| 2,187,380 | Kaltoft | Jan. 16, 1940 |
| 2,249,861 | Silver | July 22, 1941 |
| 2,363,901 | Silver | Nov. 28, 1944 |
| 2,383,689 | Silver | Aug. 28, 1945 |
| 2,385,935 | Oerman | Oct. 2, 1945 |

FOREIGN PATENTS

| Number | Country | Date |
| --- | --- | --- |
| 601 | Great Britain | of 1870 |